(12) United States Patent
Bang

(10) Patent No.: US 7,859,609 B2
(45) Date of Patent: Dec. 28, 2010

(54) BACKLIGHT UNIT AND LIQUID CRYSTAL DISPLAY DEVICE HAVING THE SAME

(75) Inventor: Ju-Young Bang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 246 days.

(21) Appl. No.: 11/477,786

(22) Filed: Jun. 30, 2006

(65) Prior Publication Data

US 2007/0147075 A1 Jun. 28, 2007

(30) Foreign Application Priority Data

Dec. 26, 2005 (KR) .................. 10-2005-0129994

(51) Int. Cl.
*G02F 1/1335* (2006.01)
*F21V 7/04* (2006.01)
(52) U.S. Cl. .............. 349/61; 349/62; 349/67; 362/608; 362/609
(58) Field of Classification Search .............. 349/67, 349/68
See application file for complete search history.

(56) References Cited

U.S. PATENT DOCUMENTS

2005/0180124 A1   8/2005   Adachi et al.
2005/0265042 A1  12/2005   Kim et al.
2005/0276066 A1  12/2005   Kim et al.
2006/0215075 A1*  9/2006   Huang et al. .................. 349/67
2007/0002565 A1*  1/2007   Han et al. ..................... 362/240

FOREIGN PATENT DOCUMENTS

| | | |
|---|---|---|
| CN | 1428640 A | 7/2003 |
| CN | 1512232 A | 7/2004 |
| CN | 1534355 A | 10/2004 |
| EP | 1 684 111 A1 | 7/2006 |
| EP | 1 693 700 A1 | 8/2006 |
| JP | 4-55086 H | 12/1992 |
| JP | 11-295731 A | 10/1999 |
| JP | 2001-318614 A | 11/2001 |
| JP | 2002-72167 A | 3/2002 |
| JP | 2004-6317 A | 1/2004 |
| JP | 2005-32575 A | 2/2005 |

OTHER PUBLICATIONS

Office Action issued Jan. 14, 2010 in corresponding Japanese Application No. 2006-178970.

* cited by examiner

*Primary Examiner*—Michelle R Connelly Cushwa
(74) *Attorney, Agent, or Firm*—Morgan Lewis & Bockius LLP

(57) ABSTRACT

A backlight unit for a liquid crystal display device includes a reflector having a plurality of grooves and one or more light emitting diodes within each of the grooves.

14 Claims, 5 Drawing Sheets

BACKLIGHT UNIT AND LIQUID CRYSTAL DISPLAY DEVICE HAVING THE SAME

The present invention claims the benefit of Korean Patent Application No. P2005-0129994 filed in Korea on Dec. 26, 2005, which is hereby incorporated by reference in its entirety.

BACKGROUND OF THE INVENTION

1. Field of the Invention

The present invention relates to a display device, and more particularly, to a backlight unit and a liquid crystal display device having the same. Although the present invention is suitable for a wide scope of applications, it is particularly suitable for an LCD backlight unit having enhanced brightness.

2. Description of the Background Art

Generally, a liquid crystal display (LCD) device is a flat panel display device. LCDs are extensively used due to the ease with which they are driven and their superior ability to display images. LCDs have been widely applied as a monitor in computers and televisions as well as an instrument display in aircrafts and ships.

An LCD device includes an LCD panel, a driving circuit unit, and a backlight unit. The driving circuit unit has integrated circuits on a printed circuit board (PCB) for driving the LCD panel. The backlight unit has a supporting structure enclosing light emitting lamps.

The backlight unit is the light source of the LCD device and consumes most of the power used by the components of the LCD device. Thus, a backlight unit emitting a bright light with a minimum amount of power is important in reducing the overall power used by the LCD device. The backlight also has to supply the same degree of brightness to each area of the LCD panel, so that the LCD device displays an image with uniform brightness.

Typically, a linear optical source, such as a fluorescent lamp, is used as the light emitting lamps in a backlight. Recently, a point optical source, such as a light emitting diode (LED), is being used to supply light to a surface of the LCD panel. Hereinafter, a related art backlight unit for an LCD device using a point optical source, such as an LED, will be explained with reference to FIGS. 1 to 3.

FIG. 1 is a cross-sectional view showing an LCD device having a backlight unit in accordance with the related art. As shown in FIG. 1, the related art LCD device has a backlight unit including an LCD panel 360 on which pixels are arranged in a matrix form and a backlight unit 300 for supplying light to the LCD panel 360. The LCD panel 360 includes a thin film transistor (TFT) array substrate (not shown), a color filter substrate (not shown) facing the TFT array substrate with a gap therebetween, and a liquid crystal layer (not shown) interposed between the color filter substrate and the TFT array substrate in the gap. Although not shown, a common electrode and a pixel electrode are respectively formed on the color filter substrate and the TFT array substrate, thereby applying an electric field across the liquid crystal layer.

The backlight unit includes a lower cover 350, a light emitting diode (LED) supporter 310 formed on an upper surface of the lower cover 350, a plurality of LEDs 330 arranged on an upper surface of the LED supporter 310 for emitting light in both horizontal and vertical directions, a light guiding plate 340 arranged above the LEDs 330 with a certain gap, a diffusion plate 347 arranged over the light guiding plate 340 for effectively diffusing light emitted from the LED 330, and a plurality of optical sheet layers 349 on the diffusion plate 347. A reflector 320 for enhancing light efficiency of the light emitted from the LED is formed below the LEDs 330.

The light guiding plate 340 is provided over all of the LEDs 330 of the backlight unit so that light emitted from the LEDs 330 can be uniformly distributed across the entire surface of the backlight unit. The LEDs can be a combination of red, green and blue LEDs. Diverters 335 for a color mixing light emitted directly from the LEDs 330 are formed on a lower surface of the light guiding plate 340 directly over each of the LEDs 330. Single-color light emitted from the LEDs 330, such as red, green or blue, is not directly displayed on the LCD panel 360 because of the diverters 335.

The LCD panel 360 and the backlight unit 300 are covered by a guide panel 351. The side surfaces of the LCD panel 360 and the backlight unit 300 are supported by a mold frame 345. An upper edge of the LCD panel 360 is fixed by a top case 370, which is coupled to the guide panel 351, and the guide panel 351 is coupled to the mold frame 345.

FIG. 2 is a cross-sectional view showing a structure of a backlight unit in accordance with the related art. As shown in FIG. 2, the related art backlight unit includes a lower cover 210, a plurality of LEDs 220 arranged on the lower cover 210 with a certain gap therebetween, a light guiding plate 230 formed above the LEDs 220 at a predetermined distance, and a plurality of diverters 235 on the light guiding plate 230 having a prism structure or formed of a reflective material corresponding to the LEDs 220. The diverter 235 prevents light from being directly emitted from the LEDs 220 and displayed on the LCD panel. The diverters aid in color mixing.

FIG. 3 is a cross-sectional view showing a direction of light emitted from a light emitting device of a backlight unit in accordance with the related art. In the related art backlight unit shown in FIGS. 1 and 2, light emitted from the LEDs is not full utilized to maximum effectiveness, which results in an inferior brightness. More specifically, as shown in FIG. 3, when power is supplied to the related art LED, approximately 20% of a total optical amount of the light is emitted in a vertical direction 12 and approximately 80% of the total optical amount is emitted in horizontal directions 14 and 16. In the related art backlight unit and the LCD device having the same, light emitted from side surfaces of the LEDs of the backlight unit is not fully utilized. Further, light emitted from the side surfaces of the LEDs of the backlight unit can be wasted due to optical absorption at the peripheral region of the backlight unit so that light is not consistently provided out to the edges of the backlight unit.

SUMMARY OF THE INVENTION

Accordingly, the present invention is directed to a backlight unit and a liquid crystal display device having the same that substantially obviate one or more of the problems due to limitations and disadvantages of the related art.

An object of the present invention is to provide an LCD backlight unit capable of enhancing a brightness and being smoothly driven by comprising a reflector having a plurality of grooves of an inclined inner circumference and a plurality of light emitting diodes formed at the grooves.

To achieve these and other advantages and in accordance with the purpose of the present invention, as embodied and broadly described herein, there is provided a backlight unit for a liquid crystal display device including a reflector having one or more grooves and a plurality of light emitting diodes within each of the grooves.

In another aspect, a liquid crystal display device includes a liquid crystal display panel, a reflector having a plurality of grooves, and one or more light emitting diodes within each of the grooves for supplying light to the liquid crystal display panel.

In another aspect, a liquid crystal display device includes a liquid crystal display panel, a reflector having a plurality of grooves, one or more light emitting diodes within each of the grooves, wherein each of the grooves contains three or more diodes from among red, green, blue and white diodes, a light guiding plate formed above the reflector, and one or more diverters formed at a lower surface of the light guiding plate in correspondence to each plurality of light emitting diodes.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Hereinafter, a backlight unit and a liquid crystal display (LCD) device having the same will be explained with reference to FIGS. 4 to 7.

Figure 1:
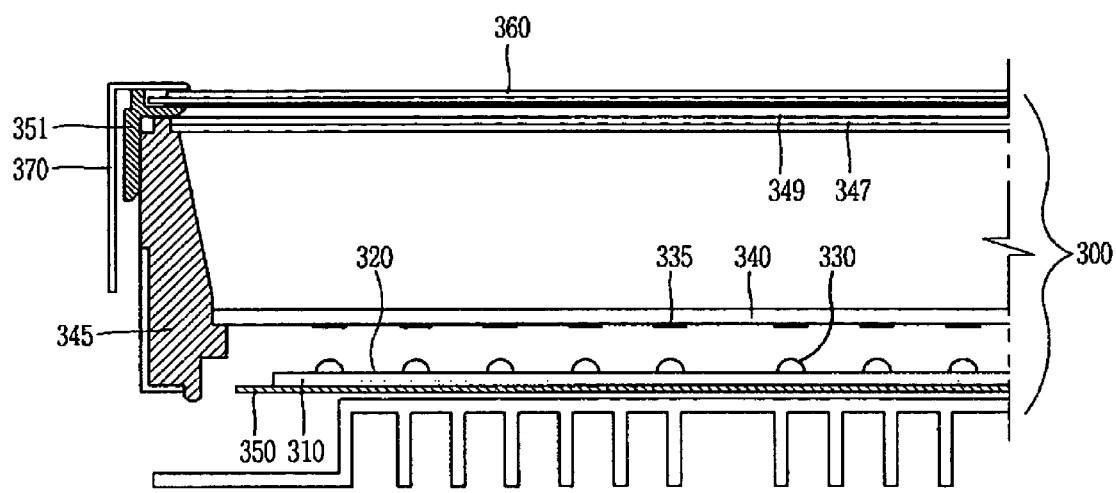
FIG. 1 is a cross-sectional view showing an LCD device having a backlight unit in accordance with the related art.
Figure 2:
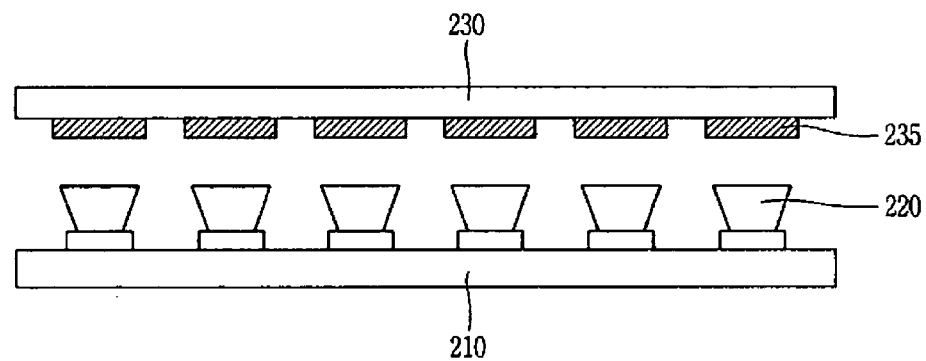
FIG. 2 is a cross-sectional view showing a structure of a backlight unit in accordance with the related art.
Figure 3:
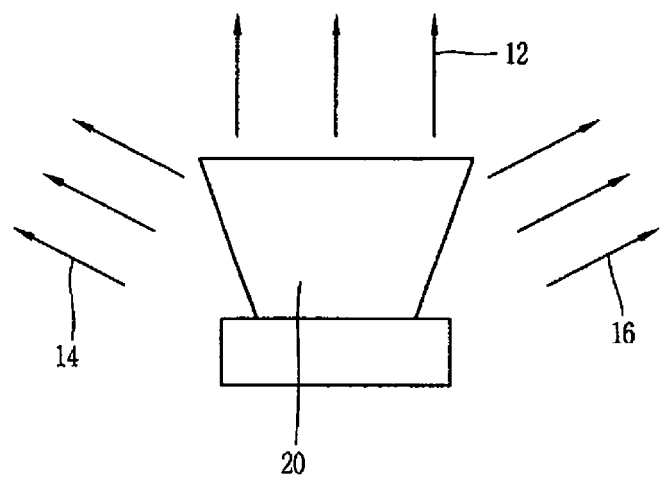
FIG. 3 is a cross-sectional view showing a direction of light emitted from a light emitting device of a backlight unit in accordance with the related art.
Figure 4:
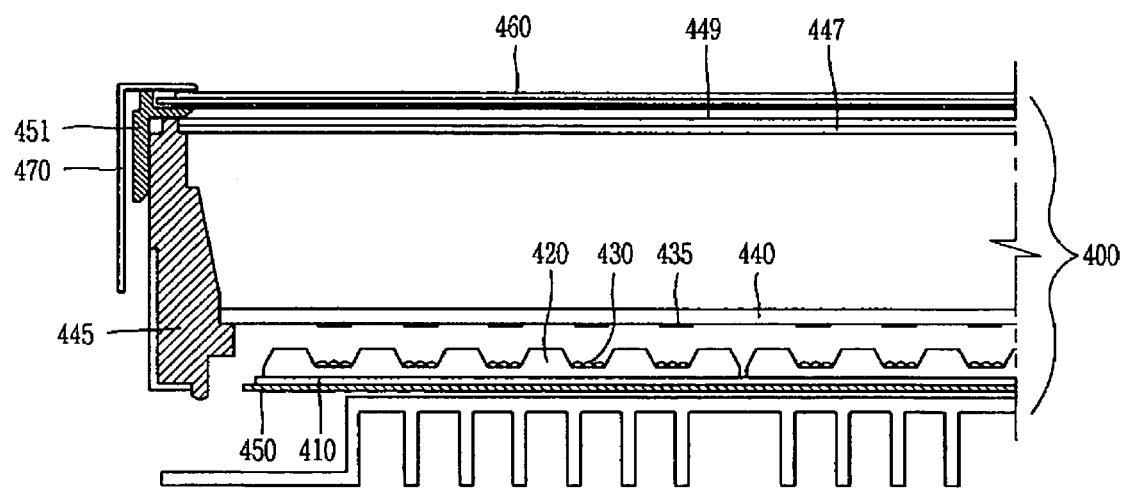
FIG. 4 is a cross-sectional view showing an LCD device having a backlight unit according to an embodiment of the present invention.

FIG. 4 is a cross-sectional view showing an LCD device having a backlight unit according to an embodiment of the present invention. As shown in FIG. 4, the LCD device according to an embodiment of the present invention includes an LCD panel 460 on which pixels are arranged in a matrix form and a backlight unit 400 on a lower surface of the LCD panel 460. Although not shown in FIG. 4, the LCD panel 460 includes a thin film transistor (TFT) array substrate (not shown), a color filter substrate (not shown) facing the TFT array substrate with a predetermined gap, and a liquid crystal layer interposed between the color filter substrate and the TFT array substrate in the gap.

A common electrode (not shown) and a pixel electrode (not shown) are respectively formed on the color filter substrate and the TFT array substrate for applying an electric field across the liquid crystal layer. If a voltage of a data signal is applied to the pixel electrode while a common voltage is applied to the common electrode, an electric field is formed between the common electrode and the pixel electrode. Also, the liquid crystal molecules of the liquid crystal layer are rearranged according to the direction and the intensity of the electric field. The LCD device displays an image by controlling an optical transmittance of each pixel through the anisotropy of the liquid crystal molecules. A switching device, such as a thin film transistor is provided at each pixel to control a voltage of a data signal applied to the pixel electrode, which is called an active matrix driving method.

The backlight unit 400 includes a lower cover 450, a light emitting diode (LED) supporter 410 formed on an upper surface of the lower cover 450, reflectors 420 formed on an upper surface of the LED supporter 410 and having a plurality of grooves 423 with inclined inner side surfaces, a plurality of LEDs 430 arranged in each of the plurality of grooves 423 for emitting light in both horizontal and vertical directions, a light guiding plate 440 arranged above the reflector 420 at a predetermined distance for uniformly distributing light across the entire surface of the LCD panel 460, a diffusion plate 447 arranged over the light guiding plate 430 for diffusing light emitted from the LEDs 430, and a plurality of optical sheet layers 449 on the diffusion plate 447.

The LEDs 430 in each of the plurality of grooves 423 can be combinations of red, green, blue and white LEDs. Diverters 435 for a color mixing of the light emitted from the LEDs 430 are formed on a lower surface of the light guiding plate 440 corresponding to the LEDs 430 in each of the plurality of grooves 423. Single-color light emitted from the LEDs 430, such as red, green or blue, is not directly displayed on the LCD panel 460 because of the diverters 435.

An aluminum heat sink for removing heat generated when the LEDs 430 emit light is attached to a rear surface of the lower cover 450. The LCD panel 460 and the backlight unit 400 are covered by a guide panel 451. The side surfaces of the LCD panel 460 and the backlight unit 400 are supported by a mold frame 445. An upper edge of the LCD panel 460 is fixed by a top case 470, which is coupled to the guide panel 451, and the guide panel 451 is coupled to the mold frame 445.

Figure 5:
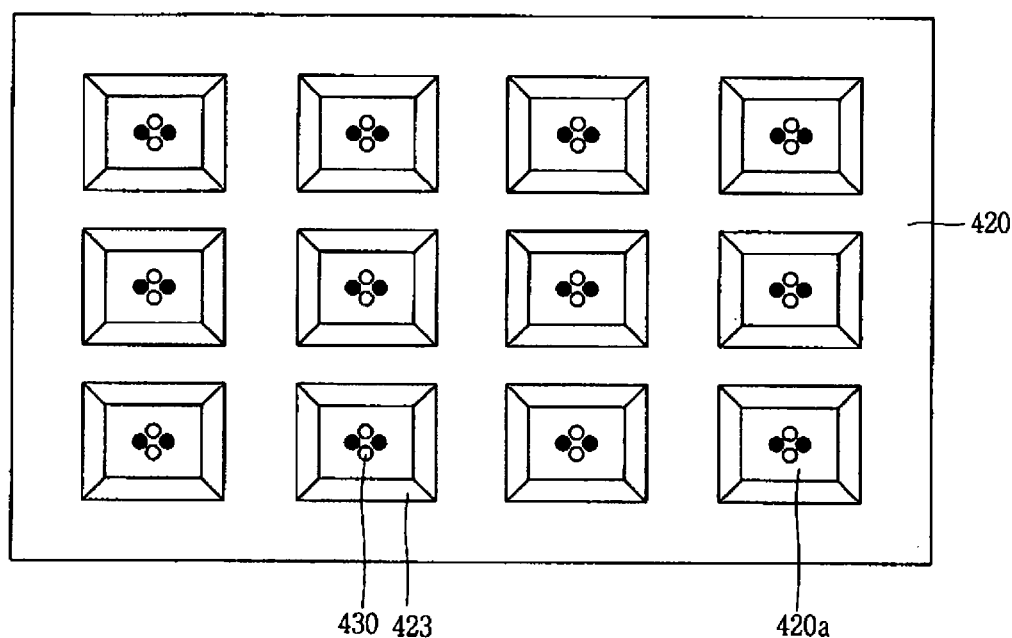
FIG. 5 is a plan view showing a reflector of the backlight unit and light emitting diodes within the reflector according to an embodiment of the present invention.
Figure 6:
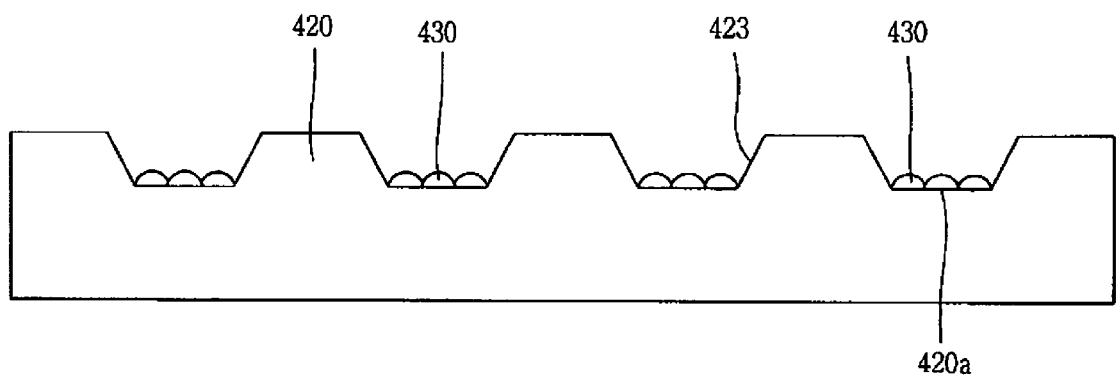
FIG. 6 is a cross-sectional view showing the reflector of the backlight unit and the light emitting diodes within the reflector according to an embodiment of the present invention.
Figure 7:
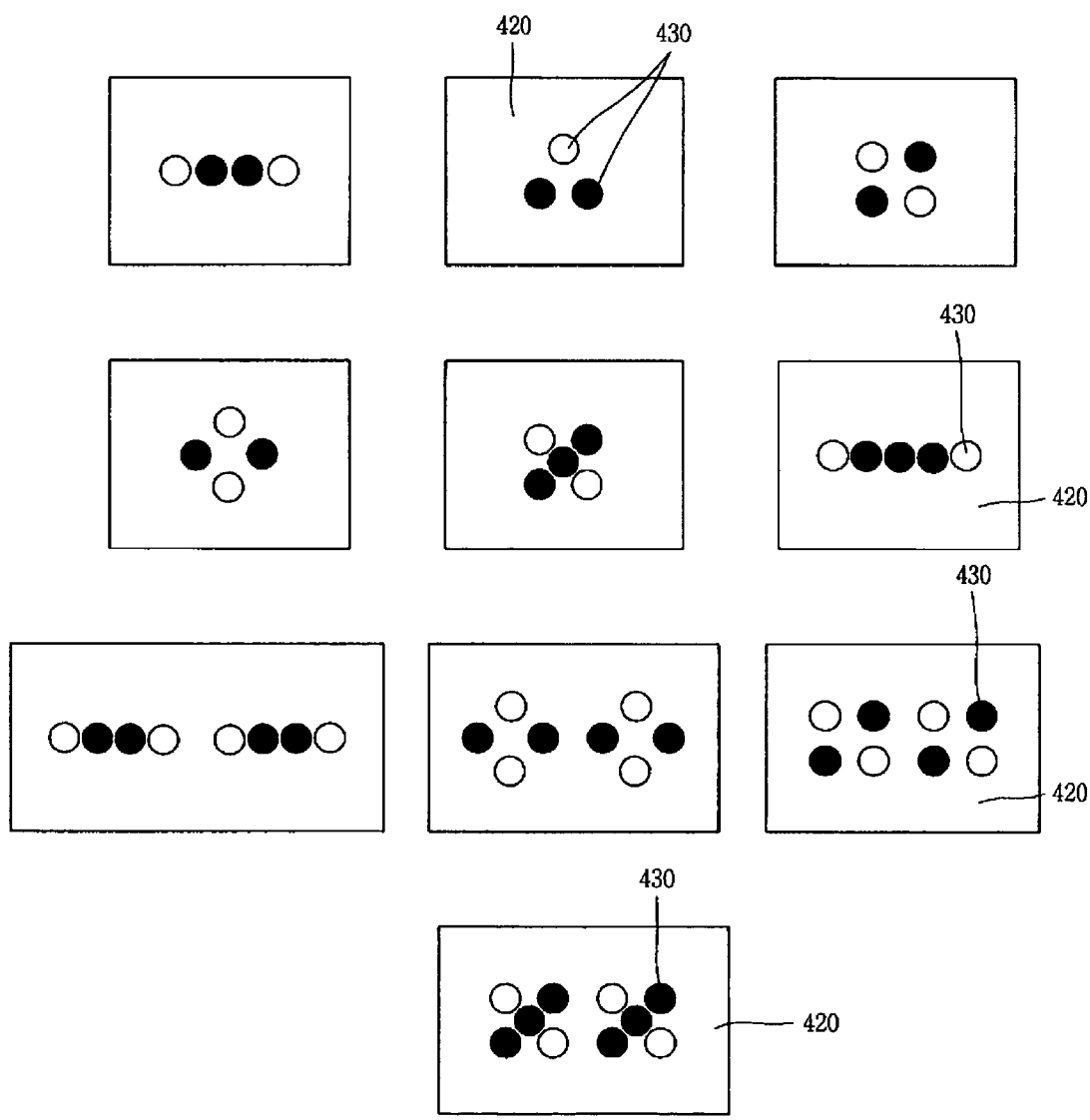
FIG. 7 is a plan view showing various arrangements of the light emitting diodes within the reflector of the backlight unit according to an embodiment of the present invention.

FIG. 5 is a plan view showing a reflector of the backlight unit and light emitting diodes within the reflector according to an embodiment of the present invention. FIG. 6 is a cross-sectional view showing the reflector of the backlight unit and the light emitting diodes within the reflector according to a first embodiment of the present invention, and FIG. 7 is a plan view showing various arrangements of the light emitting diodes within the reflector of the backlight unit according to an embodiment of the present invention.

As shown in FIGS. 5 and 6, the backlight unit includes a reflector 420 having a plurality of grooves 423 with inclined side surfaces, and a plurality of light emitting diodes 430 within the respective grooves 423. Each lower surface and each opening of the grooves 423 of the reflectors 420 have either a polygonal shape or a circular shape. The opening of the groove is larger than the lower surface of the groove. A side surface of the groove 423 is inclined by an angle of about 10~90° from the lower surface of the reflector 420, and the groove 243 has a depth of less than 40 mm.

As shown in FIG. 5, the grooves 423 are arranged in a matrix pattern. The lower surface and the opening of the groove 423 can have a polygonal shape, such as a triangular shape, a rectangular shape or a hexagonal shape. The plural grooves 423 formed in the reflector 420 can have a variety of shapes, such as a diamond shape, an oval shape or a shape having a combination of curves and lines. Although single-surfaced side surfaces are shown in FIGS. 4-6, the side surfaces can be multi-faceted.

Light emitted from a side surface of the LEDs 430 is reflected by a side surface of the groove 423 in the reflector 420 to redirect the light upwardly. Some light reflected from a side surface of the groove 423 in the reflector 420 and light received directly from a top surface of the LED 430 is reflected by the diverter 435. Light reflected from the diverter 435 is directed toward a side surface of the groove in the reflector 420 or a lower surface of the reflector 420 so as to reflected upwardly. Since light emitted from a side surface of the LED 430 is redirected upwardly, brightness of the backlight is increased and light is consistently provided out to the edges of the backlight unit.

The LEDs 430 respectively positioned within the grooves 423 of the reflector 420 can be in a variety of arrangements. For example, as shown in FIG. 7, the LEDs 430 can be arranged in a straight shape, a triangular shape, a rectangular shape, a cross shape, a diamond shape, an X shape, or each groove 423 can have a different shape. Each of the grooves 423 can accommodate three or more diodes from among red, green, blue and white diodes. For example, a groove 423 can hold a red diode, a green diode and two white diodes.

Figure 8:
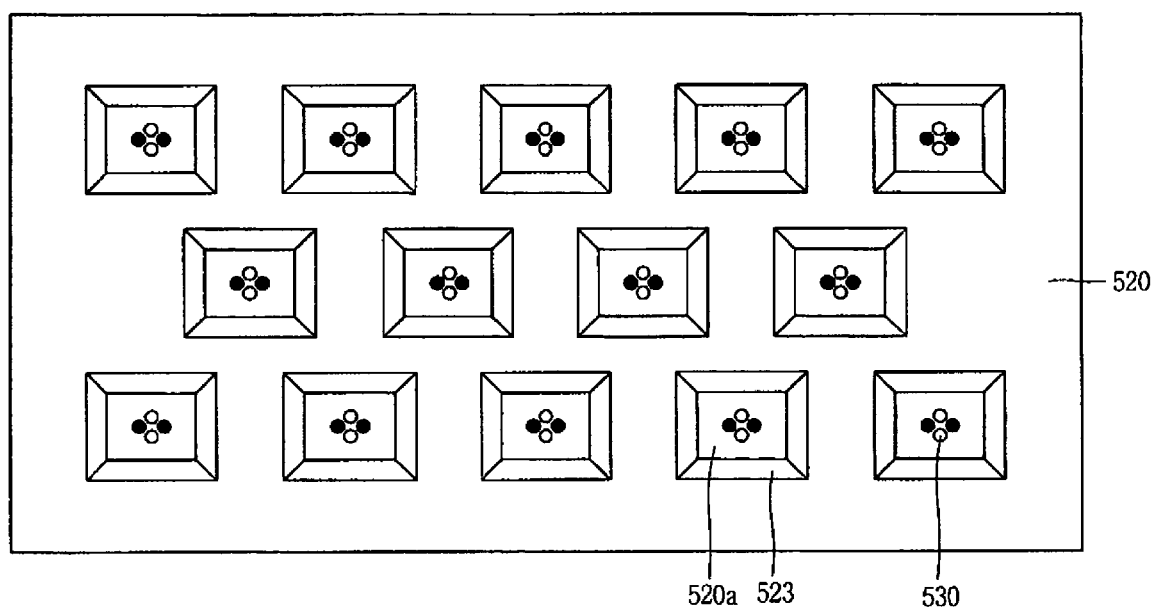
FIG. 8 is a plan view showing a reflector of the backlight unit and light emitting diodes formed at the reflector according to another embodiment of the present invention.

FIG. 8 is a plan view showing a reflector of the backlight unit and light emitting diodes within the reflector according to another embodiment of the present invention. FIG. 8 shows a reflector 520 having a plurality of grooves 523 in a zigzag pattern and a plurality of LEDs 530 formed in the grooves 523 of the reflector 520. The grooves 523 formed in the reflector 520 can have a variety of shapes as discussed above. Also, the LEDs 530 arranged at the grooves can have any of a variety of shapes as discussed above. Each of the grooves 523 can contain three or more diodes from among red, green, blue and white diodes.

In the backlight unit of FIG. 8, light emitted from side surfaces of the LEDs 530 is reflected upwardly by the reflector 520 through a light guiding plate (not shown), the diffusion plate (not shown), and the optical sheet layers (not shown). Also, light emitted from the LEDs 530 directly toward the diverters (not shown) on the reflector 520 is reflected by the diverters toward the reflector 520 and then reflected up through the light guiding plate (not shown), a diffusion plate (not shown), and a plurality of optical sheet layers (not shown). Since light emitted from both the side and top surfaces of the LEDs 530 is eventually reflected upwardly, more of the light from the LEDs 530 is illuminated onto the LCD panel. Furthermore, since light emitted from the side surfaces of the LEDs 530 is redirected upwardly, brightness of the backlight is increased and light is consistently provided out to the edges of the backlight unit.

It will be apparent to those skilled in the art that various modifications and variations can be made in the a backlight unit and a liquid crystal display device of the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:
    a reflector having a plurality of grooves, wherein each lower surface and each opening of the grooves is formed at the reflector;
    a plurality of light emitting diodes within the each lower surface of the grooves, wherein the plurality of light emitting diodes are light emitting diodes emitting different color light with each other, and each of the grooves contains three or more diodes from among red, green, blue and white diodes, and wherein the plurality of light emitting diodes emit light from both side and top surfaces;
    a light guiding plate formed above the reflector; and
    a plurality of diverters formed at a bottom surface of the light guiding plate corresponding to each of the plurality of the grooves, wherein each of the diverters corresponds to each of the grooves and the light emitting diodes within the each of the grooves.

2. The backlight unit of claim 1, wherein the each lower surface and the each opening of the grooves are a polygonal shape.

3. The backlight unit of claim 1, wherein a side surface of the groove is inclined by an angle of about 10~90° from the lower surface of the reflector.

4. The backlight unit of claim 1, wherein the groove has a depth less than 40 mM.

5. The backlight unit of claim 1, wherein the grooves are arranged in a matrix pattern.

6. The backlight unit of claim 1, wherein the grooves are arranged in a zigzag pattern.

7. The backlight unit of claim 1, wherein each of the grooves accommodates three or more diodes from among red, green, blue and white diodes.

8. A liquid crystal display device, comprising:
    a liquid crystal display panel;
    a reflector having a plurality of grooves, wherein each lower surface and each opening of the grooves is formed at the reflector;
    a plurality of light emitting diodes within the each lower surface of the grooves for supplying light to the liquid crystal display panel, wherein the plurality of light emitting diodes are light emitting diodes emitting different color light with each other, and each of the grooves contains three or more diodes from among red, green, blue and white diodes, and wherein the plurality of light emitting diodes emit light from both side and top surfaces;
    a light guiding plate formed above the reflector; and
    a plurality of diverters formed at a bottom surface of the light guiding plate corresponding to each of the plurality of the grooves, wherein each of the diverters corresponds to each of the grooves and the light emitting diodes within the each of the grooves.

9. The liquid crystal display device of claim 8, wherein the each lower surface and the each opening of the grooves are a polygonal shape.

10. The liquid crystal display device of claim 8, wherein the groove has a side surface inclined by an angle between 10~90° from a lower surface of the reflector.

11. The liquid crystal display device of claim 8, wherein the grooves have a depth less than 40 mm.

12. The liquid crystal display device of claim 8, wherein the grooves are arranged in a matrix pattern.

13. The liquid crystal display device of claim 8, wherein the grooves are arranged in a zigzag pattern.

14. A liquid crystal display device, comprising:

a liquid crystal display panel;

a reflector having a plurality of grooves, wherein each lower surface and each opening of the grooves is formed at the reflector, and each of the grooves has a side surface inclined by an angle between 10~90° from a lower surface of the reflector, and each of the grooves has a depth less than 40 mm;

a plurality of light emitting diodes within each of the grooves, wherein the each lower surface of the grooves contains three or more diodes from among red, green, blue and white diodes, wherein the light emitting diodes emit light from both side and top surfaces;

a light guiding plate formed above the reflector; and a plurality of diverters formed at a bottom surface of the light guiding plate corresponding to each of the grooves, wherein each of the diverters corresponds to each of the grooves and the light emitting diodes within the each of the grooves.

* * * * *